March 7, 1967  J. L. BETZEN  3,307,526
INTERNAL COMBUSTION ENGINES
Filed June 17, 1966  8 Sheets-Sheet 1

FIG.1

J.L.BETZEN
INVENTOR.

BY
Ely Silverman
ATTORNEY

March 7, 1967 — J. L. BETZEN — 3,307,526
INTERNAL COMBUSTION ENGINES
Filed June 17, 1966 — 8 Sheets-Sheet 2

J.L. BETZEN
INVENTOR.

BY Ely Silverman
ATTORNEY

March 7, 1967 J. L. BETZEN 3,307,526
INTERNAL COMBUSTION ENGINES
Filed June 17, 1966 8 Sheets-Sheet 3

J. L. BETZEN
INVENTOR.

BY
Ely Silverman
ATTORNEY

March 7, 1967 J. L. BETZEN 3,307,526
INTERNAL COMBUSTION ENGINES
Filed June 17, 1966 8 Sheets-Sheet 8

INVENTOR.
J. L. BETZEN
BY
Ely Silverman
ATTORNEY

United States Patent Office 3,307,526
Patented Mar. 7, 1967

3,307,526
INTERNAL COMBUSTION ENGINES
John L. Betzen, Deaf Smith County, Tex.
(Rte. 1, Hereford, Tex. 79045)
Filed June 17, 1966, Ser. No. 558,475
5 Claims. (Cl. 123—8)

This application is a continuation-in-part of my copending application S.N. 219,534 filed August 27, 1962.

This invention relates to an improved engine of the internal combustion type. According to this invention hollow cylinders rotate about the axes of such cylinders to provide compression and combustion chambers of circular outline and crescent shape, with circular outlines of these chambers change relative to each other during the operation of the engine.

One object of this invention is to provide internal combustion engines of a very great power to weight ratio.

Another object is to provide internal combustion engines with very few moving parts.

Another object of this invention is to provide an engine providing continuous combustion.

Another object is to provide an internal combustion engine with a continually expanding combustion chamber.

Yet another object of this invention is to provide internal combustion engines of improved thermal and mechanical efficiency and requiring no muffler.

Other objects and advantages of this invention will be apparent to those skilled in the art on the study of the below disclosure of which the drawings attached hereto form a part and wherein like numerals denote like parts in the various figures, and wherein.

Figure 7:
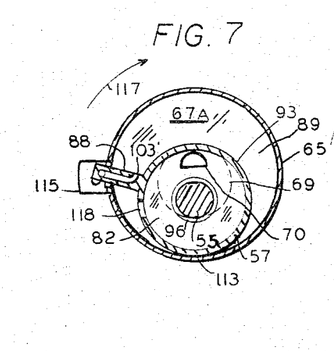
FIGURES 7, 8, 9 and 10 are transverse sections, shown diagrammatically and on reduced scale, taken through section 7A–7B of FIGURE 5 during operation of the embodiment of FIGURES 1–5.
Figure 8:
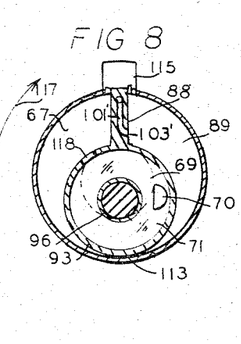
Figure 9:
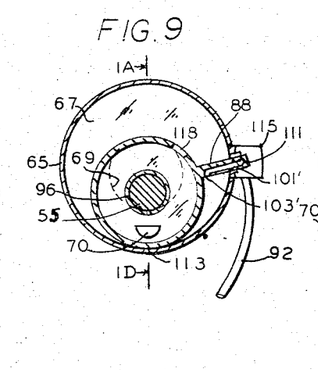
Figure 10:
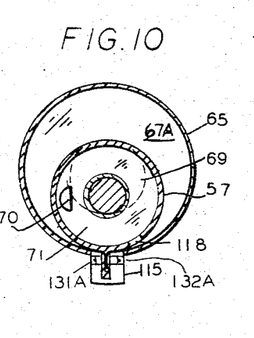
Figure 11:
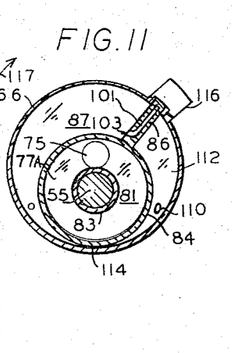
FIGURES 11, 12, 13 and 14 are transverse sectional views, shown diagrammatically and on reduced scale, through plane 11A–11B of FIGURE 5 during operation of the embodiment of FIGS. 1–5.
Figure 12:
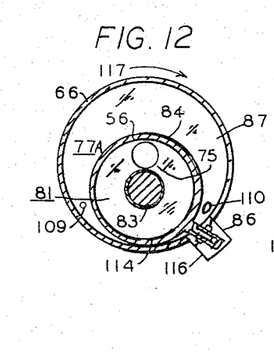
Figure 13:
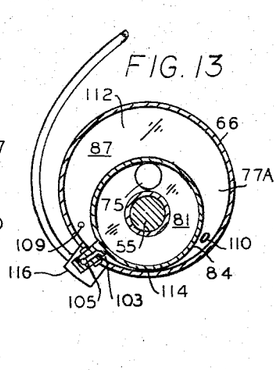
Figure 14:
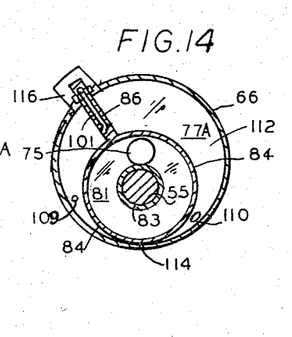

FIGURES 7 and 11 are drawn to the same scale and the elements are therein shown at their relative positions at the same point in the cycle of operation of the apparatus of FIGURES 1 through 5; FIGURES 8 and 12 are drawn to the same scale as FIGURES 7 and 11 and the elements of FIGURES 8 and 12 are shown at their relative positions at the same point in the cycle of operation of the apparatus of FIGURES 1 through 5 this point being subsequent in time by one-fourth cycle to that point in the cycle shown in FIGURES 7 and 11. FIGURES 9 and 13 correspond as do FIGURES 8 and 12, with the FIGURES 9 and 13 showing positions of elements at a point one-fourth cycle subsequent to that shown in FIGURES 8 and 12. FIGURES 10 and 14 correspond as do FIGURES 7 and 11 with the FIGURES 10 and 13 showing positions of elements at a point one-fourth cycle subsequent to that shown in FIGURES 9 and 13.

Figure 1:
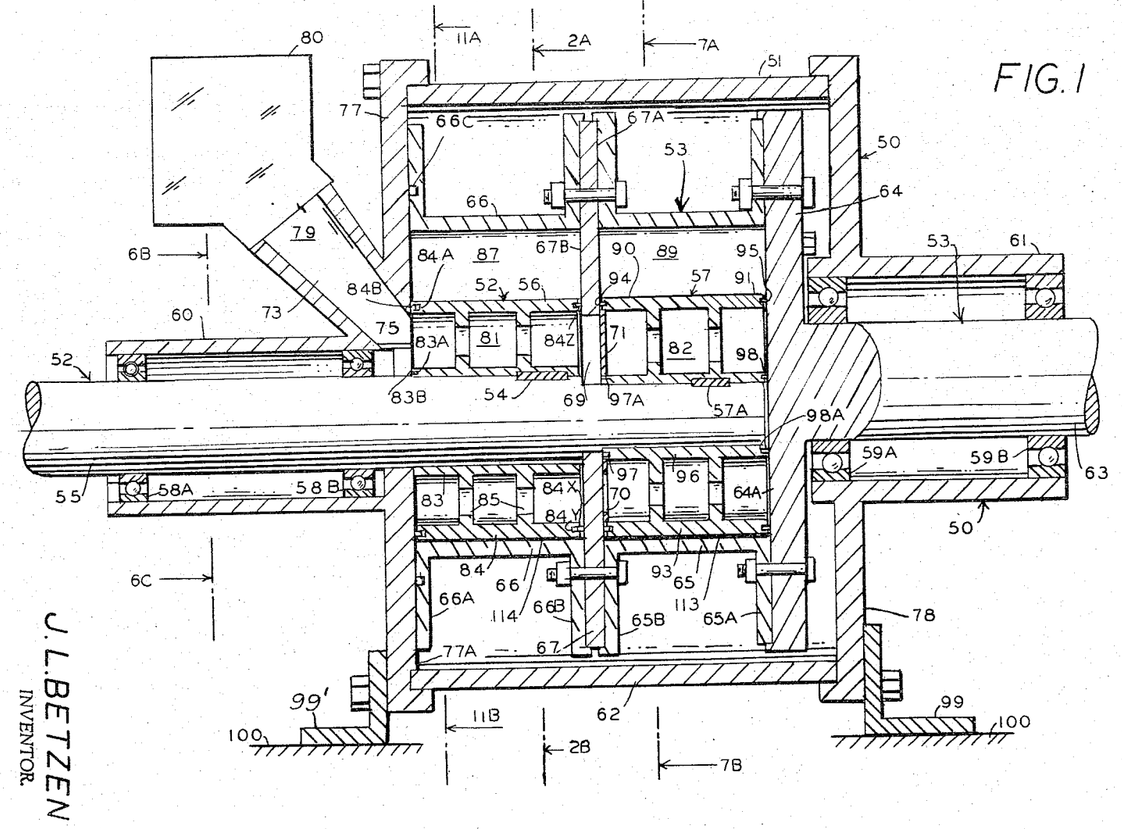
FIGURE 1 is a longitudinal cross-sectional along plane 1A–1D of FIGURE 9, showing one embodiment of this invention.
Figure 15:
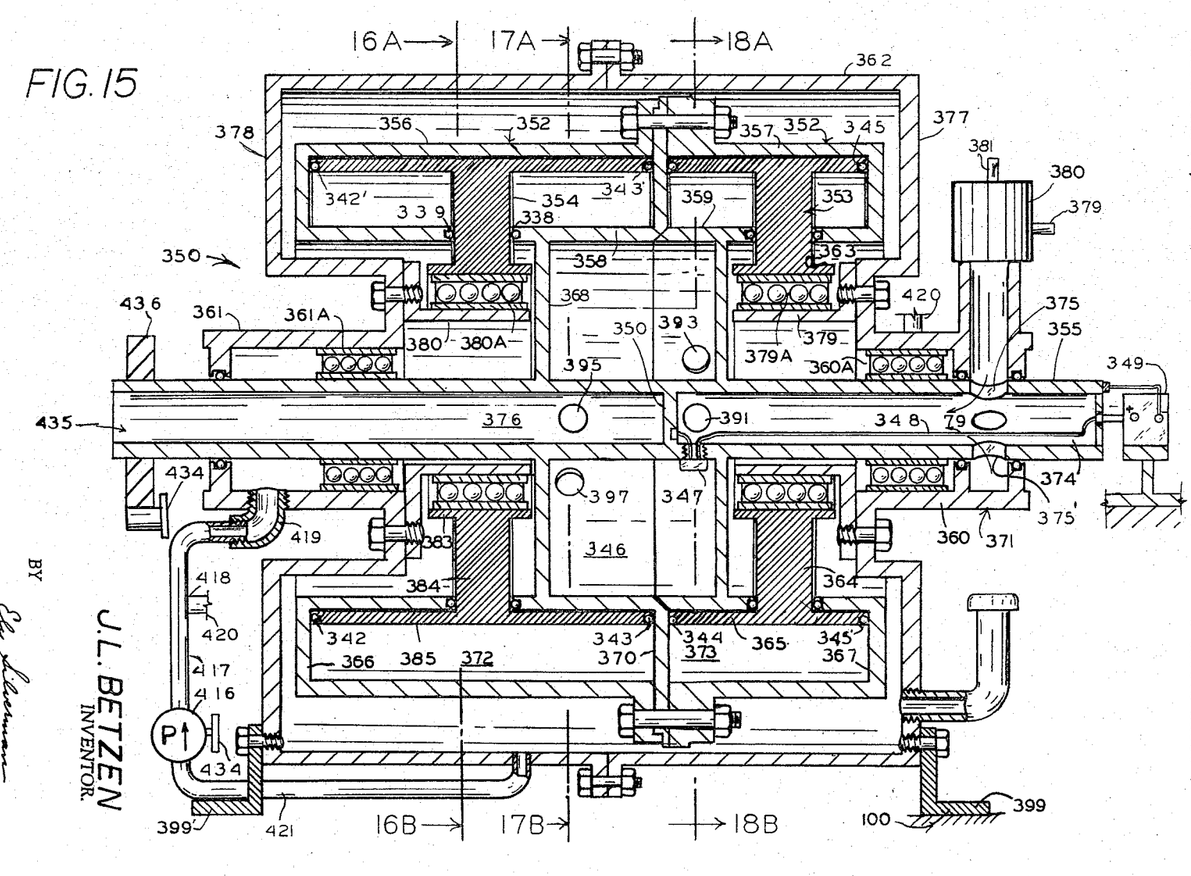
FIGURE 15 is a longitudinal vertical sectional view as seen through plane 15A–15B of FIGURE 16, of another embodiment of apparatus according to this invention.

FIGURES 22–25 and FIGURES 26–29 correspond to FIGURES 7–10 and 11–14, respectively, to diagrammatically illustrate the relations of the major components of the apparatus shown in FIGURE 15 in steps of one-fourth cycle in the same manner as FIGURES 7–14 diagrammatically illustrate the relations of the major components at one-fourth cycle steps for the embodiment of FIGURE 1.

The embodiment of FIGURE 1, generally shown as 50, comprises a fixedly supported exterior housing shell 51, and, rotatably supported therein, a first rotating or drive subassembly 52 and a second rotating or compressor subassembly 53.

Housing shell 51 comprises lateral input housing 60 supported on a vertical heavy steel end wall 77, a sectional heavy steel end wall 78 supporting a lateral output bearing housing 71 and a cylindrical housing shell 62 firmly joined at its ends to said plates 77 and 78. At their bottom portions plates 77 and 78 are fixedly supported, as by feet 99' and 99 to the ground 100.

The major portions of the rotatable subassembly 52 comprise a cylindrical axially rotatable horizontal compressor shaft 55, a first hollow cylindrical interior combustion housing or shell 56 concentric with said shaft and keyed thereto by key 54 and a hollow interior compressor housing or shell 57 which smoothly fits on and is concentric with and is keyed at 57A to such shaft 55. The cylindrical compressor shaft 55 is rotatably supported on axially spaced apart co-axial needle bearings 58A and 58B, the housings of which bearings are fixedly located in the lateral input housing portion 60 of the housing shell 51.

The major portions of the second or compressor subassembly 53 comprise a cylindrical axially rotatable horizontal drive shaft, 63, firmly attached to a vertical flat circular faceplate 64, an outer cylindrical hollow compressor shell 65 concentric with the shaft 63 and attached by flanges 65A to and supported by face plate 64, a vertical ¼ in. thick flat circular shaped steel diaphragm plate 67, which plate is fixedly attached to shell 65 by its flange 65B and a hollow cylindrical outer combustion shell 66 firmly attached by its flange 66B to plate 67 and co-axial with hollow cylindrical shell 65. The axes of shafts 55 and 63 are parallel to each other and spaced away from each other by about one inch in the preferred embodiment of FIG. 1. Shaft 63 is rotatably supported in axially spaced apart co-axial needle bearings 59A and 59B which are firmly located in the lateral drive or output housing portion 61 of housing shell 51.

Diaphragm plate 67 has a centrally located circular orifice 69 having its center in line with the axis of shaft 63 and has a radius equal to the sum of the radius of cylindrical shaft 55 plus the distance between the axes of shafts 63 and 55. This permits shaft 55 to move freely therein as below described. Periodically, as below described, an orifice 70 in the vertical end wall 71 of shell 57 and orifice 69 in diaphragm plate 67 are continuous with each other.

An inlet conduit 73 passes through an inlet orifice 75 in the vertical end wall, 77, of the casing 71. It provides for passage of a gas, or combustible gasoline-air gas mixture as 79 formed in the conventional carburetor 80, into the annular chamber 81 between the cylindrical walls 83 and 84 that form the inner hollow cylindrical housing 56. Ribbing members as 85 between walls 83 and 84 in the shell 56 are perforated with such perforations occupying the major cross-sectional area of such ribbing member measured in a vertical plane (normal to the longitudinal axis of housing 56) to provide a passageway for the injected gas mixture 79 through the shell 56 and thence, via orifice 69, to the orifice 70 in the shell 57 and so brings the gas or combustible mixture from inlet 75 into the annular chamber 82 in shell 57 between inner cylindrical wall 96 and outer wall 93 of said shell.

The end edges of wall 83 and 84 of shell 56 are grooved as at 83A and 84A and those grooves are each provided with sealing rings, 83B and 84B respectively, where each such horizontally elongated cylindrical wall contacts a flat vertical wall as end wall 77 and the vertical flat wall 67B of diaphragm plate 67. These seals and walls 83, 84, 77 and 67 form a gas tight seal although said vertical walls are movable relative to said end edges of the cylindrical walls. A similar groove and seal in such groove is provided at the free flange edge, 66A, of shell 66 for location of a sealing ring 66C to gas tightedly seal said flange edges and the inner surface of the inner flat surface 77A of the wall 77. The rear edge 84X of wall 84 of shell 56 opposite to the edge 84B is also grooved, as at 84A, at 84Y and is provided with sealing ring 84Z for a gas tight seal with wall 67B.

The outside radius of the shell 56 plus the length of the displacement of the axis of shaft 55 from the axis of shaft 63 is the internal radius of shell 66. The outside radius of shell 57 plus the length of displacement of the axis of shaft 55 from the axis of shaft 63 is the internal radius of shell 65. The outside of shell 57 contacts the inside of shell 65 along a line of contact 113 with a substantially gas-tight seal. The outside of shell 56 contacts the inside of shell 66 along a line of contact 114 with a substantially gas-tight seal. Lines 113 and 114 parallel the axes of shafts 55 and 63.

The edges 90 and 91 of the outer wall 93 of shell 57 are grooved and provided with sealing rings 94 and 95, respectively, to form a gas tight seal with the inner flat vertical wall 64A of plate 64 and with the adjacent flat wall 67A of plate 67, although such walls and shell are movable relative to each other. Each of the ends of the inner wall 96 of the compressor housing 57 is also provided with sealing rings at 97 and 98 in corresponding grooves therefor 97A and 98A to effect a gas tight seal between those elements.

A first drive chamber ear plate 86 is fixedly attached to the outside of shell 56 for the full length thereof. It is provided at each of its ends with sealing elements (86A and 86B) to provide a gas tight seal with flat walls surfaces 67B and 77A. This ear projects through the crescent shaped space 87 between shells 66 and 56 and is slidably yet gas tightedly held by sealing blocks as 131 and 132 in valve receptacle 116 as below described. The sides of ear 86 are smooth, flat and imperforate.

A second driven chamber ear plate 88 is fixedly attached to the outside of shell 57 for the full length thereof. It is provided at its ends with sealing elements (as 86A and 86B) to provide a gas tight seal with the flat inner surface 64A of wall plate 64 and the adjacent flat surface 67A of diaphragm plate 67. This ear projects through the crescent shaped space 89 between the shells 57 and 65 and is slidably yet gas tightedly held by sealing blocks such as 131A and 132A in valve receptacle 115.

During operation, the gaseous mixture 79 passes through orifices 118 in wall 93 of shell 57 to pass to the upper side (as shown in FIGURE 7) of the lug or ear 88. Gaseous mixture 79 passes into the space 89 between shells 57 and 65 by the vacuum there developed, as below described, until the orifice 70 loses continuity with the orifice 69 in the plate 67 as shafts 55 and 63 continue to rotate in the clockwise direction of arrow 117 of the FIGURES 7–8 and 11–12. Then, as the ear 88 of the shell 65 extends the full length of the chamber 89 and closes the gap between shell 57 and shell 65 it acts, on said clockwise rotation of those shells, to prevent escape of mixture 79 and to compress such gaseous mixture during rotation as shown in FIGURES 7, 8 and 9.

A U-sectioned valve receptacle 116 opening to chamber 87 is attached to the periphery of the shell 66 with the longitudinal axis of the U radially extending from the shell 66 and a similarly U-shaped valve receptacle 115 open to space 89 is attached to the shell 65. The U-sectioned receptacles project laterally from the shell 65 and 66, respectively, with a 140° difference in phase, with the central longitudinal axis of the combustion chamber receptacle 116 leading the central longitudinal axis of receptacle 115 for the compression chamber 89, as measured in a clockwise direction.

The ears 86 and 88 are each provided with a channel, as 101 in 86, therein that open—as via opening 103—to the adjacent chamber or space as 87. The channel 101 also has an opening 105 that is sealed, except for a limited portion of the operating cycle, below described, by the end wall 67B of chamber 116. An orifice 107 in that wall connects during a limited portion of the operating cycle to one end of a conduit 92 which conveys compressed gaseous or gaseous combustible mixture thereto. The other end of conduit 92 connects to receptacle 115. Receptacle 115 encloses structures as in receptacle 116. Ear 88 has a passageway therethrough, as 101′, and one end thereof has an orifice as 103′ open to chamber 89 and the other end of said passageway is connected to an orifice 111 in ear 88 which is open during the phase of shells 56, 57, 65, and 66 as shown in FIGURES 9, 10, 13, and 14 and operatively connected—i.e. open—to conduit 92 whereby to pass compressed air or combustible gas from compression chamber 89 to combustion chamber 87. At all other positions the orifices 105 and 111 are so positioned relative to such orifices of such conduit 92 as to not connect the passageways in the ears 86 and 88 with that conduit.

Figure 2:
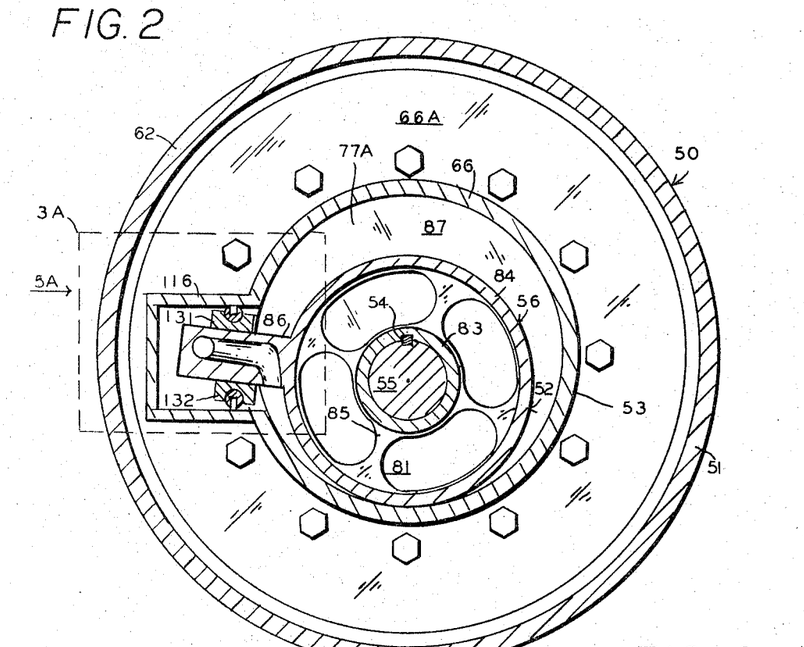
FIGURE 2 is a transverse cross-sectional view taken along section 2A–2B of FIGURE 1.
Figure 3:
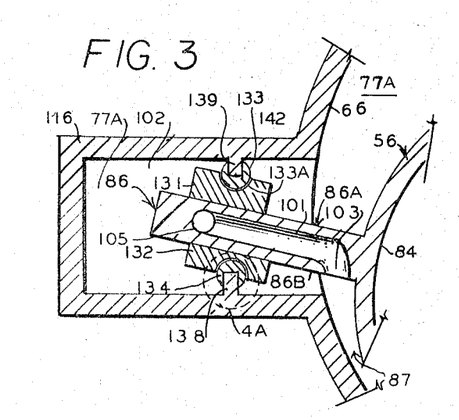
FIGURE 3 is a view of the mechanism in zone 3A of FIGURE 2.
Figure 4:
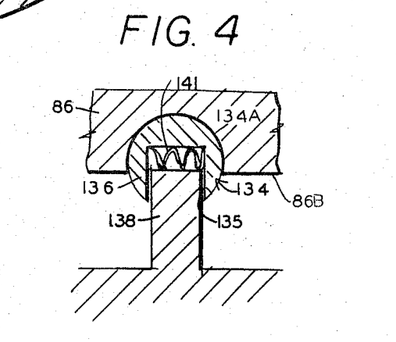
FIGURE 4 is an enlarged view of zone 4A of FIGURE 3.
Figure 5:
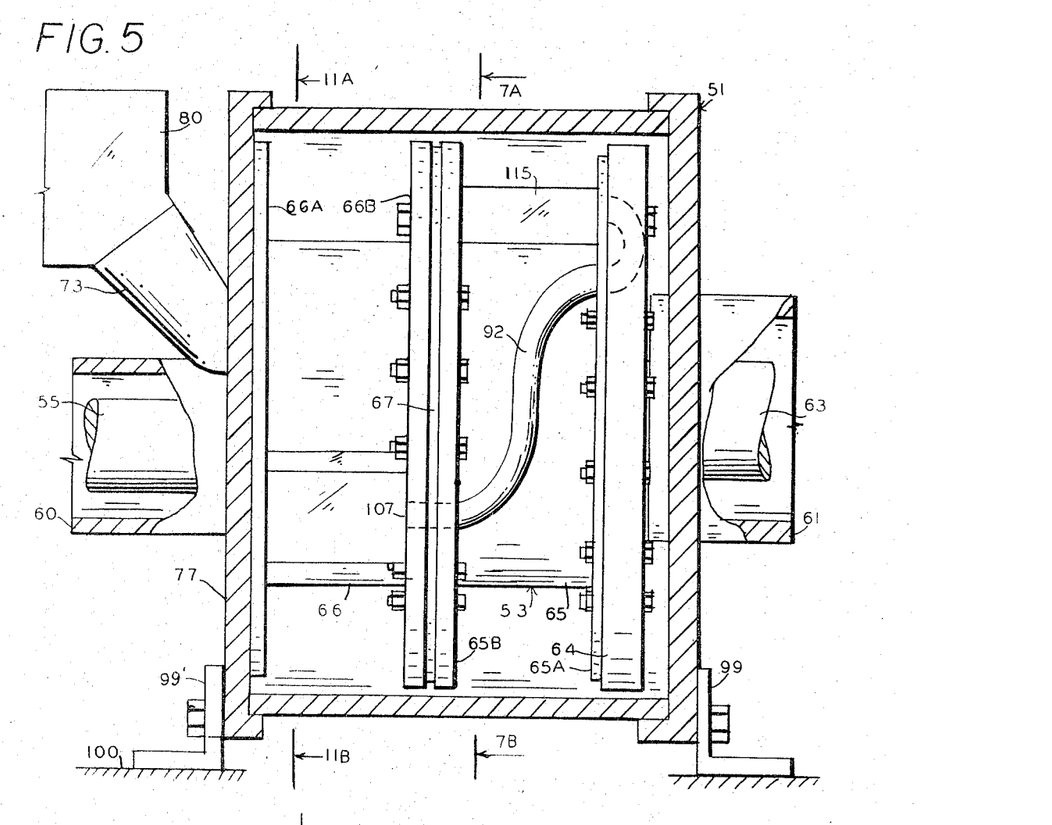
FIGURE 5 is a side view, partly broken away, along section 5B–5C of FIGURE 6 taken along the direction of the arrow 5A in FIGURE 2 with components thereof oriented as shown in FIGURES 8 and 12.
Figure 6:
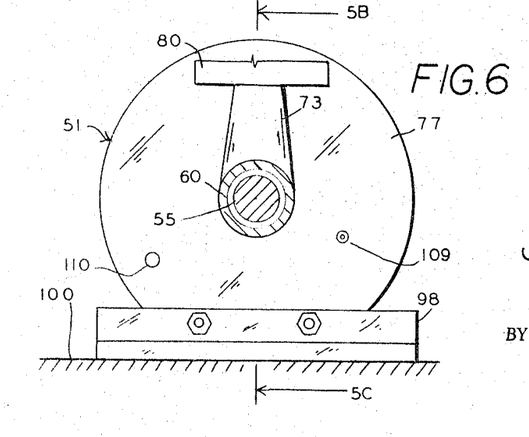
FIGURE 6 is an end view, partly in section, of the embodiment shown in FIGURE 1 viewed along the section 6B–6C in FIGURE 1.

As shown in FIGURES 2 and 3, the flat upper and lower surfaces 86A and 86B of ear 86 slides against similarly flat surfaces of sealing blocks 131 and 132 and form a gas-tight seal therewith. These blocks extend the length of the ear as 86 and are rotatably and resiliently held in position by generally cylindrically shaped heads 133 and 134. The blocks 131 and 132 each have matching curved orifices 133A and 134A, respectively, therein to smoothly and rotatably receive such heads. The interior of each such head as 134 has a slot 135 which is rectangular in shape and forms a sliding smooth-fitting skirt as 136 which is held against and extends over an imperforate wall as 138 (and 139 for head 133) of rectangular shape to provide a tight yet slidable fit thereof into slot 135. Walls as 138 and 139 are each supported on and firmly attached to the receptacle therefor. Each head, as 134, is spring urged—as by spring 141—towards its ear 86 and thereby provides for resilient, yet gas-tight, positioning of each such ear, as 86, on each block such as 131 and 132. Thus the blocks as 131 and 132 are slidably and in gas-tight engagement with ears as 86. A similar structure is provided for ear 88. The blocks 131 and 132 rotate about their cylindrical pivot heads as 133 and 134 and the pivot heads are in turn fixed in position vertically and resiliently by the rectangular walls as 138 and 139, which walls are in turn fastened to a receptacle as 115 on shell 65 or 116 on shell 66 respectively.

As the shells 65 and 57 rotate from the position of FIGURE 7 to the position shown in FIGURE 9 the gas mixture in chamber 89 is highly compressed—usually to a 7 to 1 or a 9 to 1 ratio. The conduit 92 then conducts the compressed gas via inlet orifice as 107 in chamber 116 to the space 87 between outer shell 66 and its inner shell 56. The shell 56 has gas-tight seals with walls 77A and 67B although rotatable with respect thereto and is rotatably contained in the outer shell 66 (supported on the shell 65) as shown in FIGURES 1 and 11 through 14. In the position of chambers 87 and 89 shown in FIGURE 10 and FIGURE 14 the conduit between chambers 87 and 89 is closed by movement of ears 86 and 88. The combustible mixture then in chamber 87 is ignited by the conventional ignition spark plug 109 in the wall 77. This spark plug periodically fires in fixed relation to the rotation of the cylinders 56 and 66 in the same manner as any other magneto fires at a definite point in the cycle in an internal combustion engine. Combustion of the compressed combustible gaseous mixture at a point in the cycle as shown in FIGURE 14 results in expansion of the combustion gases resulting from such combustion. Such expansion moves the ear 86, and the attached shell 56, because of expansion of the gas in the gas-tight volume bounded by contact line 114, shells 56 and 66, walls 77A and 67B and ear 86, through the sequence shown in FIGURES 11, 12, and 13. In this sequence the ear 86 extends the full length of the chamber 87 and provides a ledge which blocks off escape of the combustion gases until the scavenging outlet or exhaust outlet 110 in the wall 77 is exposed as in position of elements as shown in FIGURE 12. The ignition of combustible mixture subsequently added into chamber area 87 between the shells 56 and 66 and combustion and expansion of that subsequently added mixture causes the ear 86 to again be driven clockwise around the shaft 55 and to force completion of the exhaustion of the previously combusted gases remaining in zone 112 of FIGURES 11 and 14 (to the right or clockwise position of ear 86) through the orifice 110 in the fixed end wall 77.

The embodiment of FIGURE 15, generally shown as 350, comprises a fixedly supported exterior housing shell assembly 351, and, rotatably supported therein, a first rotating or driving subassembly 352 and a second rotating compressor chamber seal subassembly 353 and a third rotating combustion chamber seal subassembly 354.

Housing shell subassembly 351 comprises a sturdy vertical rigid end wall 377 and a hollow or cylindrical lateral input bearing 360 supported on the outside of vertical heavy steel end wall 377, a vertical rigid heavy steel end wall 378 supporting on the outside thereof a hollow cylindrical lateral output bearing housing 361 and a hollow rigid sturdy cylindrical housing shell 362 firmly joined at its ends to the inner sides of plates 377 and 378. At their bottom portions plates 377 and 378 are fixedly supported, as by feet 399' and 399 to the ground 100. Shell 362 and housings 361 and 360 are co-axial.

The plates 377 and 378 each support on their inner surface a cylindrical bearing support 379 and 380, respectively, for subassemblies 353 and 354, respectively. The axis of supports 379 and of 380 are co-axial with each other and are parallel to the horizontal longitudinal axis of shaft 355 but vertically spaced therefrom one inch.

The major portions of the rotatable subassembly 352 are a hollow cylindrical axially rotatable horizontal compressor shaft 355, a first hollow cylindrical exterior combustion shell 356 concentric with shaft 355 and fixed thereto, and a hollow exterior compressor shell 357, a transversely slotted interior combustion shell 358, a transversely interior compressor shell 359, an imperforate annular combustion chamber end plate 376, an imperforate annular compressor chamber end plate 367, and imperforate annular combustion chamber support plate 368, an imperforate annular compressor chamber support plate 369, an imperforate annular separator plate 370. Elements 355–9 and 366–370 are all firmly fixed to each other and are all concentric with shaft 355.

The cylindrical shaft 355 is rotatably supported on axially spaced apart co-axial input-and-output roller or needle bearings 360A and 361A, the housings of which bearings 360 and 361 are fixedly located on the end walls of housing shell 351.

Shells 356 and 358 are each firmly attached by gas-tight connections to plates 366 and 370, and define combustion chamber 372 therebetween. Shell 357 and 359 are firmly attached by gas-tight connections to plates 367 and 370 and define compressor chamber 373 therebetween.

A straight flat rigid imperforate compressor drive plate 389 extends radially (relative to the axis of shaft 355) from the outer surface of shell 359 to the inner surface of shell 357 and in a plane parallel to the axis of shaft 355. Plate 389 is firmly attached all along its outer or radial edge to shell 357, all along its left (as shown in FIG. 15) edge to plate 370, and along its right (as shown in FIG. 15) edge to plate 367.

Figures 16, 17, 18:
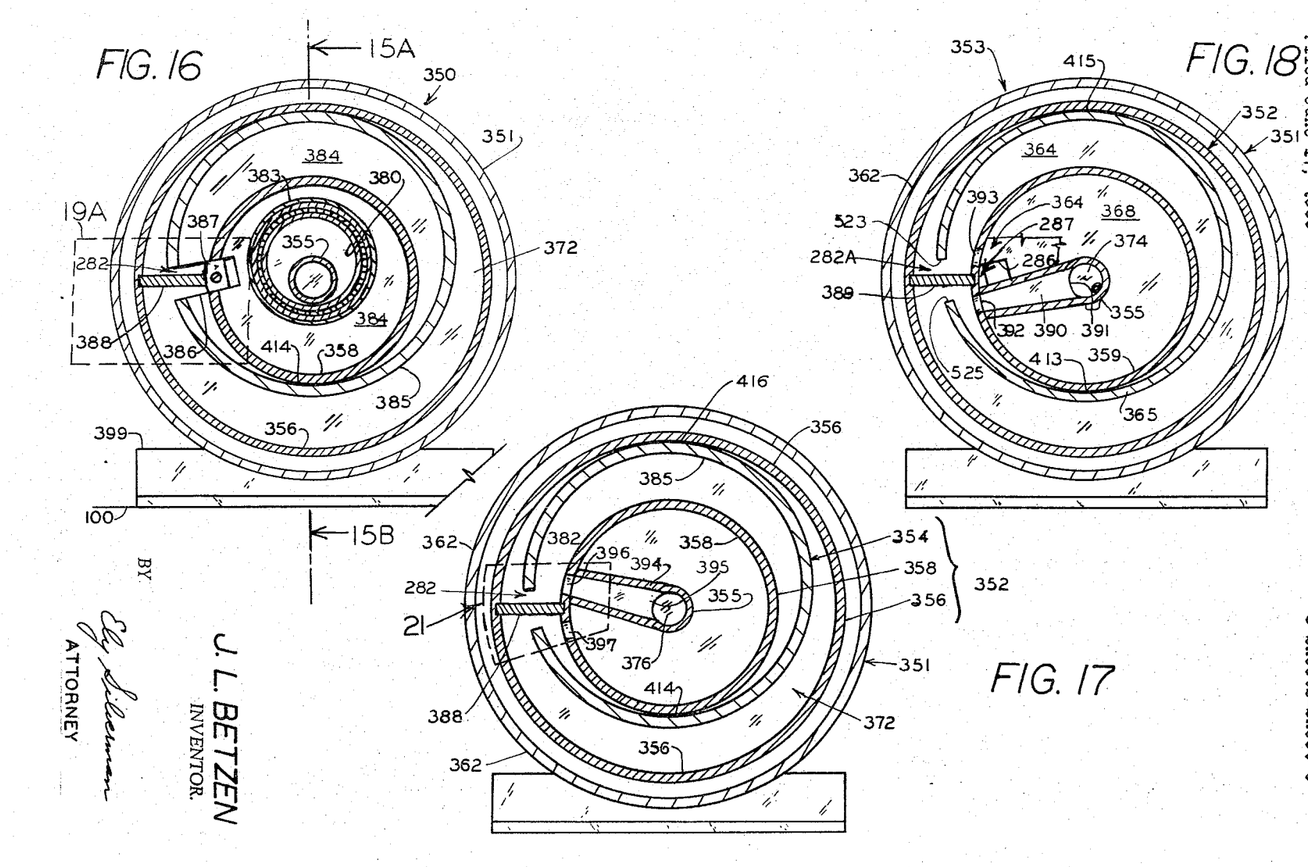
FIGURE 16 is a transverse sectional view through section 16A–16B of FIGURE 15.
FIGURE 17 is a transverse sectional view through section 17A–17B of FIGURE 15.
FIGURE 18 is a transverse sectional view through section 18A–18B of FIGURE 15 with plate 369 partly broken away.

The inner edge or central edge of plate 389 is attached, as in FIG. 18, firmly and in a gas-tight manner to shell 359 except where that shell is transversely slotted to accept the support plate 364.

A hollow inlet conduit 390 passes from an orifice 391 in the wall of hollow shaft 355; an inlet orifice 392 in shell 359 connects the conduit 390 to the conduit chamber 374 and to chamber 373 between shells 359 and 357. Orifice 392 is located counterclockwise (as seen in FIG. 18) of plate 389. A compressor chamber outlet orifice 393 is located in shell 359 in a plane that passes through the center of orifice 392 and perpendicular to the axis of shaft 355 and that orifice is adjacent the clockwise side of plate 389.

A straight flat rigid imperforate combustion chamber drive plate 388 extends radially (relative to the axis of shaft 355) from the outer surface of shell 358 to the inner surface of shell 356 and in a plane parallel to the axis of shaft 355. Plate 388 is firmly attached all along its outer edge to shell 356 all along its left (as shown in FIG. 15) edge to plate 366, and along its right (as shown in FIG. 15) edge to plate 370.

The inner edge of plate 388 is attached, as in FIG. 17, firmly and in a gas-tight manner to shell 358 except where that shell is transversely slotted to accept the support plate 384.

A hollow exhaust conduit 394 passes from an exhaust orifice 395 in the wall of hollow shaft 355 to shell 358; an outlet orifice 396 in shell 358 connects the conduit 394 to the outlet portion 376 of chamber 374 and to chamber 372 between shells 358 and 356. Orifice 396 is located clockwise (as seen in FIG. 17) of plate 388. A combustion chamber inlet orifice 397 is located in shell 358 in a plane passing through orifice 396 perpendicular to the axis of shaft 355; that orifice is adjacent the other (counterclockwise) side of plate 388.

The major portions of the second or compressor chamber seal subassembly 353 are a hollow cylindrical axially rotatable compressor journal 363, with its longitudinal axis horizontal, firmly attached to a rigid sturdy vertical flat annular compressor chamber seal support plate 364, and outer cylindrical C-shaped hollow compressor shell 365 concentric with the axis of journal 363 and attached to and supported by the outer edge of annular support plate 364. Journal 363 is co-axial with and supported on bearing 379A on bearing support 379. Shell 365 journal 363, and plate 364 are concentric. Plate 364 has a radial slot 286 therein corresponding to slot 386 of plate 384 and a pivotal seal support 287 therein. Items 286 and 287 correspond to items 386 and 387, respectively, which are described below.

The major portions of the third or combustion chamber seal subassembly 354 are a hollow cylindrical axially rotatable combustion journal 383, with its axis horizontal, firmly attached to a rigid sturdy vertical flat annular combustion chamber seal support plate 384, and a hollow outer cylindrical C-shaped compressor shell 385, concentric with the axis of journal 383 and attached to the outer edge of and supported by annular plate 384. The journal 383 is co-axial with and supported on bearing 380A on bearing support 380; shell 385 and plate 384 and journal 383 are concentric. Plate 384 has a radially extending slot 386 therein. A pivotally seal support 387 pivots alternately about its shaft 335 within the combustion chamber seal support plate slot 386 and is attached by a gas-tight connections to plate 358 (see FIG. 20) and 388 (see FIG. 19). A similar seal support 287 is provided for the compressor chamber seal support plate 384. The mechanical relations of the compressor and combustion shells 365 and 385 to the structures in the chambers 373 and 372 are generally the same, hence the description of one seal support applies to both subassemblies 353 and 354.

The combustion chamber seal shell 385 is located within chamber 372; at its upper edge it contacts the inner surface of the top of shell 356; at its lower edge the inner surface contacts the outer surface of the bottom of shell 358 and forms an effective although low friction gas-tight seal therewith. The shell 385 (like 365) is C-shaped. The space between the arms of the C includes but does not contact the drive plate 388 and no seals are provided on the ends 423 and 425 of the arms of the C, i.e., on either side of the longitudinal slot 282 in combustion chamber seal shell 385 (and corresponding slot 282a in compressor chamber seal shell 365) to form no contact with the drive plate therebetween, as 388, in the combustion chamber, 372 (and 389 in chamber 373).

A pivoting seal support unit 387 comprises a body 487 and flat rectangular sealing plates 330 and 331 that are resiliently urged into gas-tight contact with sides 320 and 321 of radial slot 386 by springs as 332 and 333 and form gas-tight seals with the sides 320 and 321 of the radial slot 386. A pin 335 is pivotally mounted in shell 358 and the body 487 and pivotally fixes seal unit 387 to the shell 358. A square sealing plate 336 is slidably mounted in a slot 334 therefor in plate 338. It extends longitudinally of chamber 372 for the axial length of plate 384. It is urged by a spring 337 also in that slot to maintain a gas-tight seal between plate 388 and the body 487. C-shaped sealing rings 338 and 339, urged by springs as 340 and 341, seal shell 358 to plate 384, and similar O-shaped rings 342' and 343' and springs therefor seal left and right edges 342 and 343 of shell 385 to walls 366 and 370, respectively, and similar rings 344 and 345 and springs therefor seal edges 344' and 345' of shell 365 to plates 370 and 367, respectively. These sealing rings and the grooves therefor corespond in structure to rings 97 and 98 and grooves 97A and 98A described for the embodiment of FIG. 1.

The chamber within shaft 355 is separated by a blocking plate 350 into the inlet portion 374 and an outlet portion 376. A battery 349 acts by insulated conductor line 348 to heat a hotpoint 347 to cause combustion of gas in the chamber 346 interior of shell 358 and bounded by walls 368 and 369. A one-way valve 400 may be provided at orifice 390.

The longitudinal axes of bearings 361A and 380 are parallel to each other and spaced away from each other by about one inch in the preferred embodiment. Shaft 355 is rotatably supported in axially spaced apart co-axial needle bearings 361A and 360A which are firmly located in the end plates of the static housing shell 362.

A conventional carburetor 380 is supported on manifold 371; the outlet of the carburetor is connected to the inlet of the manifold 371. An air inlet 379 and a fuel supply 381 are operatively connected to the carburetor. The carburetor is conventional and forms a conventional combustible gas-air mixture and discharges same into manifold 371.

The outside radius of the shell 357 plus the length of the displacement of the axis of shaft 355 from the axis of shell 365 is the internal radius of shell 357. The outside radius of shell 358 plus the length of displacement of the axis of shaft 355 from the axis of shell 385 is the internal radius of shell 356. The outside of shells 359 and 358 contact the inside of shells 365 and 385 along longitudinal lines of contact 413 and 414, respectively, with a substantially gas-tight seal. The outside of shells 365 and 385 contacts the inside of shells 357 and 356 along longitudinal lines of contact 415 and 416, respectively, with a substantially gas-tight seal. Lines 413, 414, 415, and 416 parallel the axis of shaft 355.

The edges 342' and 343' of the combustion chamber seal shell 385 are grooved and provided with sealing rings 342 and 343, respectively, to form a gas-tight seal with the inner flat vertical wall of plate 366 and with the thereto adjacent flat wall of plate 370, respectively, although such walls and shell are movable relative to each other. Each of the ends of the shell 365 of the compressor chamber 373 are also provided with sealing rings as 344 and 345 in corresponding grooves therefor (as 97A and 98A of FIG. 1) to effect a gas-tight seal between those elements and walls 370 and 367.

During operation, the gaseous combustible mixture or 79 passes through carburetor 380 and orifices 375 and 392 to pass to the lower side (as shown in corresponding FIGURES 18 and 22) of the plate 389. Gaseous mixture 79 first passes into the space 289 between shells 359 and 365 because of the relative vacuum there developed, as below described, as shaft 355 rotates in the clockwise direction of arrow 317 of the FIGURES 22–25.

Figures 22, 23:
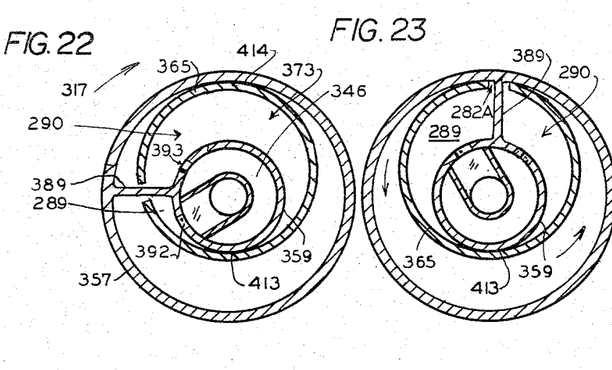
FIGURES 22–25 are transverse sections shown diagrammatically and on reduced scale, taken through section 18A–18B of FIGURE 15 during operation of the embodiment of FIGURES 15–18.
Figure 24:
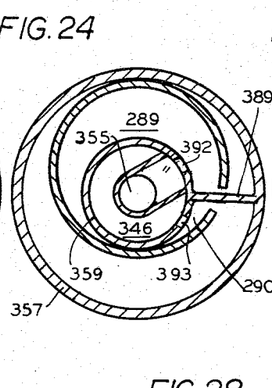
Figure 25:
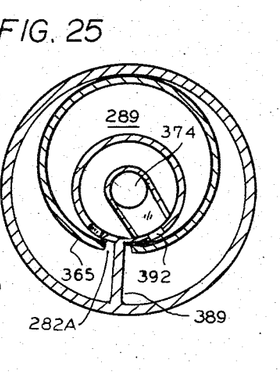

The line of contact 413 forms a gas-tight seal between shells 365 and 359. On continued rotation of the shell 357 the gas mix in chamber 290 previously on the counterclockwise side of the plate 389 is compresed in the gas-tight chamber formed by walls of shells 357 and 359 and plates 389, 370, and 367 line 414 and the seals on shells 365 and 359 and plate 389 and pivotal seal support unit 287.

The compressed gas passes through outlet orifice 393 to chamber 346. The gas is there ignited by hotpoint 347 and expands. The heated and compressed gas passes through orifice 397 into the chamber 291 between contact line 416, plate 388 and the portion of shells 356 and 358 counterclockwise of plate 388 as shown in the corresponding FIGURES 17 and 26.

Figure 19:
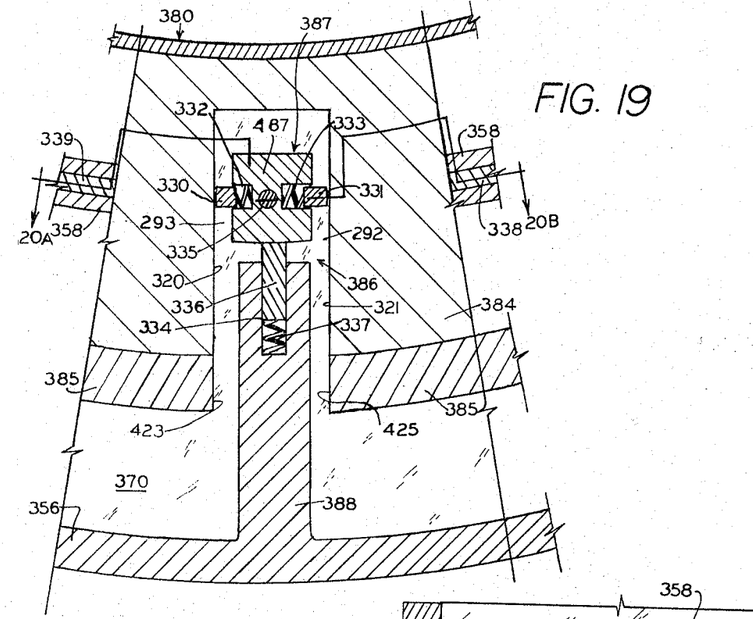
FIGURE 19 is an enlarged view of zone 19A of FIGURE 16, along plane 19B–19C of FIGURE 20.
Figures 20, 21:
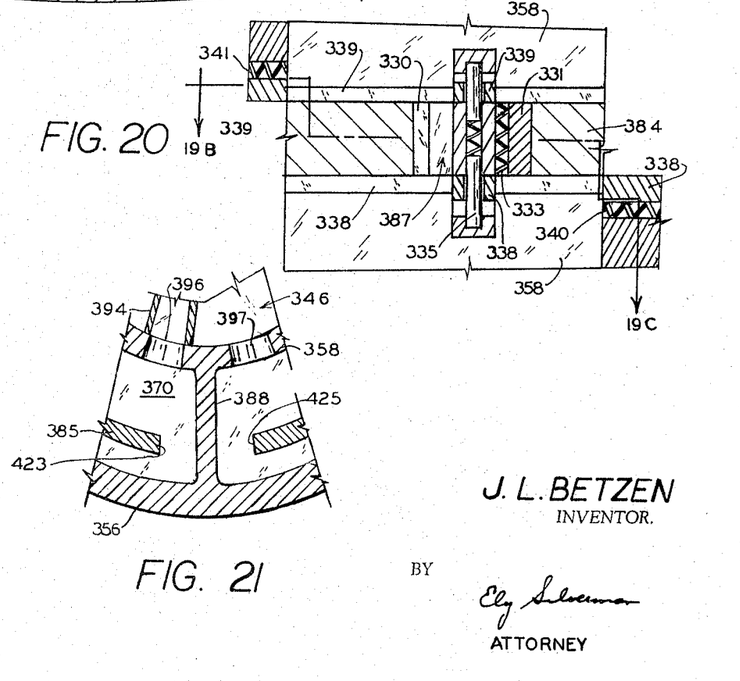
FIGURE 20 is a plan view of zone 19A of FIGURE 16 along plane 20A–20B of FIGURE 19.
FIGURE 21 is an enlarged view of zone 21 of FIGURE 17.

The portion 292 of slot 386 and 282 on the right side of the plate 388 as shown in FIG. 19 provide for free communication of the gas on that right side of plate 384 between shells 356 and 358 also on the right as shown in FIG. 15 with the right portion of chamber 372 between shells 385 and 358 on the left side of plate 384 as shown in FIG. 15. The slot 282 and open passage 293 on the left of plate 388 between shells 358 and 385 in FIG. 19 provides for similar communication of the portions of chamber 372 on left and right side of plate 388 in FIG. 15. The slot 286 and 282A structure in plate 364 provide for communication between the portions of chamber 373 to the left and right (as seen in FIG. 15) of plate 364 in the same manner.

Figure 26:
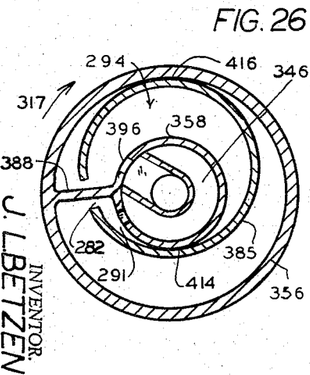
FIGURES 26–29 are transverse sectional views, shown diagrammatically in reduced scale through zone 17A–17B of FIGURE 15 during operation of the embodiment of FIGURES 15–18.
Figure 27:
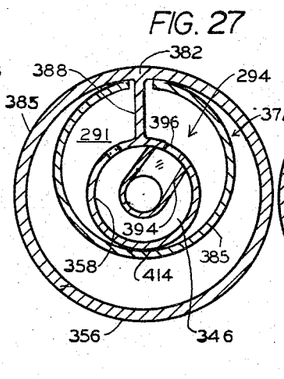
Figure 28:
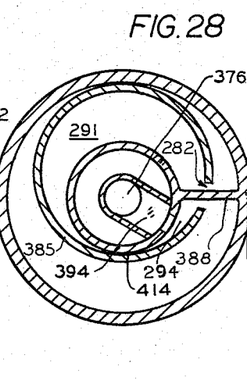
Figure 29:
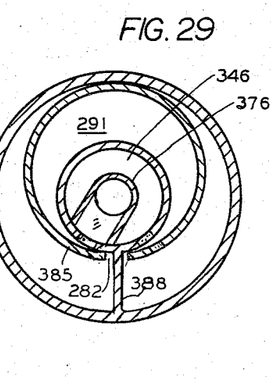

The line of contact 414 forms a gas-tight seal between shells 385 and 358. Expansion of the gas in chamber 291 forces clockwise rotation of plate 388 as shown in FIGURES 26, 27, and 28. Further rotation of shell 356 moves the combustion chamber outlet orifice 396 clockwise of sealing contact line 414, and the gas in chamber 291 passes through conduit 394 to discharge chamber 376. Further rotation of plate 388 and shell 356 as in FIGURES 26-29 forces the combustion gas out of the exhaust chamber 294 which is between line 414, shells 358 and 385 clockwise of plate 388, thence out of conduit 394 and thence via chamber portion 376 of shaft 355 out of the engine 350. This exhaust action in chamber 294 occurs concurrent with the combustion gas expansion in chamber 291 above described.

The shells 356 and 357 of subassembly 352 are firmly joined together as shown in FIG. 15 and rotate together. The action in combustion chamber 372, therefore, drives the elements in compressor chamber 373. The combustion gas expansion chamber 291 provides for continuous expansion of the combustion gases added thereto.

T-shaped seals as 271-279 in my co-pending application S.N. 219,534, filed August 27, 1962, may be provided in the walls of the above-discussed chambers 289, 290, 291, and 294.

Lubrication of engine 350 is provided by a pump 416 which discharges lubricant by line 417 to a T 418; the T connects to a discharge end lubricator line 419 and to an inlet end lubricator line 420; these lines operatively connect to the interior of housings 361 and 360, respectively: thereby lubrication fluid is provided to the bearings of subassemblies 352, 353 and 354. The lubricant also acts as a coolant. The lubricant flows to the bottom of shell 362 and is collected by collection line 421 for return to pump 416.

The pump 416 is operatively connected to a drive pulley 434. The discharge end 435 of shaft 355 has a drive gear 436 attached thereto. The gear is operatively attached to the pump drive pulley 434 and is used also as a power driving means.

In the particular embodiment of the embodiment 350 of FIG. 15 above described, the length of shell 362 is 12½"; the outside diameter thereof is 14"; shells 357 and 356 are each 12¾" O.D. Chamber 373 is (from interior wall of 366 to facing interior wall of 370) 8¼" long and 2½" from outer wall of shell 358 to outer wall of shell 356; chamber 373 has a similar 2" radial size and a 4⅛ inch length from inner surface of wall 367 to facing surface of wall 370 and the machining was accurate to 0.005 inch. Shells 356, 365, 357, 385 and ¼" thick.

Although, in accordance with the provisions of the patent statutes, particular preferred embodiments of this invention have been described and the principles of the invention have been described in the best mode in which it is now contemplated applying such principles, it will be understood that the constructions shown and described are merely illustrative and that the invention is not limited thereto.

I claim:

1. An internal combustion engine comprising a first rotatable sub-assembly and a second rotatable sub-assembly,
    said first rotatable sub-assembly comprising an end wall plate one side of which has a flat surface, and a first hollow cylinder attached thereto with the axis of said first hollow cylinder normal to the plane of said flat plate, a support with an axis coaxial with the axis of said first hollow cylinder connected to and supporting said end plate, means rotatably supporting said support,
    said second rotatable sub-assembly comprising a shaft and a second hollow cylinder attached thereto and co-axial therewith, said second hollow cylinder having a lesser outer diameter than the inner diameter of the first hollow cylinder and located therein, said second hollow cylinder having its longitudinal axis parallel to but displaced from the axis of the first hollow cylinder, the outer radius of said second hollow cylinder plus the displacement of its axis from the axis of the first hollow cylinder being the inner radius of said first hollow cylinder and a gas-tight line of contact is formed and maintained between the adjacent surfaces of said two cylinders,
    a second flat end wall plate extending parallel to said first plate at the other end of said first hollow cylinder and forming a gas-tight connection therewith, and
    a closure plate extending in a plane normal to said flat surfaces from the said outer surface of the inner cylinder to the inner surface of said outer cylinder for the length of said first and second cylindrical surfaces, said closure plate forming a gas-tight contact with the first and second flat end wall plates as well as with the inner and outer cylinders thereby forming two chambers between the outer cylinder and the inner cylinder,
        one such chamber being bounded by the outside surface of the inner cylinder, the inside surface of the outer cylinder, the two flat end walls, one side of the closure plate and the line of contact between the inner and outer cylinders, there being also an exhaust orifice in one of said chambers and an opening for injecting components of a combustible mixture into the other chamber and means for such injecting operatively connected to such opening and
        wherein the space between the inner cylinder and and the outer cylinder is divided by an imperforate partition between those cylinders and extending in a plane normal to the axes of those cylinders and one said closure plate extends from the inner cylinder to the outer cylinder on one side of said partition in one of said chambers and another closure plate extends from the inner cylinder to the outer cylinder in the other of said chambers on the other side of said partition.

2. Apparatus as in claim 1 wherein
    the support for said first hollow cylinder is a shaft with its axis co-axial with the axis of the first hollow cylinder and is attached to the end wall plate opposite to the side at which the first hollow cylinder is attached thereto and said shaft is rotatably supported in a housing, and wherein
    between said inner and outer cylinders another of said chambers is bounded by the inner surface of the outer cylinder, the outer surface of the inner cylinder, the two flat end walls, the line of contact between the inner and outer cylinders and the other side of said closure plate, and wherein
    the closure plates extending from the inner cylinder to the outer cylinder in the different chambers are located in different planes.

3. Apparatus as in claim 2 wherein said partition is fixed to one said sub-assembly and is provided with an orifice within the area bounded by the second hollow cylinder and in contact therewith and said second hollow cylinder is attached to a closure plate which is in contact with the partition and which closure plate is provided with an orifice in said partition which is contiguous with said latter orifice only in a predetermined position of said rotating sub-assemblies.

4. Apparatus as in claim 1 wherein
    the second hollow cylinder is rotatably supported on a bearing co-axial therewith and said first hollow cylinder is rotatably supported on a bearing co-axial therewith, and the axis of said bearing for said first hollow cylinder is parallel to and displaced from the axis of said first cylinder.

5. Apparatus as in claim 4 wherein
    a third rotatable cylinder of equal diameter to the first cylinder is rotatably supported on a bearing co-axial with said first cylinder and wherein said support for said second cylinder is hollow and has a longitudinal chamber therein and a first radial conduit extends from said chamber to the exterior of said second cylinder on one side of said imperforate partition to a first side of said closure plate and a second conduit extends from said chamber to the exterior of said second cylinder on the other side of said imperforate plate and to another side of said closure plate, said end wall of said inner cylinder and the interior wall of said second hollow cylinder forming a second chamber, and one orifice between said chamber and the exterior of said second hollow cylinder on the one side of said imperforate partition adjacent said first conduit and on a side of said closure plate opposite thereto and, a second orifice between said chamber and the exterior of said second hollow cylinder on the other side of said imperforate plate adjacent the second conduit and on the side of the closure plate opposite thereto, and a gas tight means in said chamber in said support for said second cylinder between said first conduit and said second conduit.

References Cited by the Examiner

UNITED STATES PATENTS

| | | | |
|---|---|---|---|
| 865,206 | 9/1907 | Ranck | 123—16 |
| 1,496,704 | 6/1924 | Caminez | 103—121 |
| 1,525,364 | 2/1925 | Brett | 123—8 |
| 1,636,799 | 2/1927 | Berntsen | 103—121 |
| 1,841,841 | 1/1932 | Munn | 123—8 |
| 2,641,196 | 6/1953 | Falcon | 103—154 |
| 2,775,210 | 12/1956 | Buchmann | 103—154 |

FOREIGN PATENTS

| | | |
|---|---|---|
| 537,527 | 3/1922 | France. |
| 1,026,523 | 2/1953 | France. |
| 756,958 | 9/1956 | Great Britain. |

DONLEY J. STOCKING, *Primary Examiner.*

R. M. VARGO, *Assistant Examiner.*